US008924838B2

(12) United States Patent
Spivack et al.

(10) Patent No.: US 8,924,838 B2
(45) Date of Patent: Dec. 30, 2014

(54) HARVESTING DATA FROM PAGE (75) Inventors: Nova Spivack, Sherman Oaks, CA (US); Christopher W. Jones, Mill Valley, CA (US); Lewis W. Tucker, San Francisco, CA (US)

(73) Assignee: VCVC III LLC., Seattle, WA (US)

( * ) Notice: Subject to any disclaimer, the term of this patent is extended or adjusted under 35 U.S.C. 154(b) by 919 days.

(21) Appl. No.: 11/835,079

(22) Filed: Aug. 7, 2007

(65) Prior Publication Data

US 2008/0189267 A1   Aug. 7, 2008

Related U.S. Application Data (60) Provisional application No. 60/821,891, filed on Aug. 9, 2006.

(51) Int. Cl.
*G06F 17/21* (2006.01)
*G06F 17/30* (2006.01)

(52) U.S. Cl.
CPC .................. *G06F 17/3089* (2013.01)
USPC ....................................... 715/205

(58) Field of Classification Search
USPC ................................. 715/234, 205
See application file for complete search history.

(56) References Cited

U.S. PATENT DOCUMENTS

| | | |
|---|---|---|
| 5,408,657 A | 4/1995 | Bigelow et al. |
| 5,515,532 A | 5/1996 | Iijima et al. |
| 5,548,749 A | 8/1996 | Kroenke et al. |
| 5,717,924 A | 2/1998 | Kawai |
| 5,809,297 A | 9/1998 | Kroenke et al. |
| 5,819,086 A | 10/1998 | Kroenke |
| 5,905,498 A | 5/1999 | Diament |
| 5,925,100 A | 7/1999 | Drewry et al. |
| 5,966,686 A | 10/1999 | Heidorn et al. |
| 6,173,287 B1 | 1/2001 | Eberman et al. |
| 6,311,194 B1 | 10/2001 | Sheth et al. |
| 6,363,377 B1 | 3/2002 | Kravets et al. |
| 6,411,952 B1 | 6/2002 | Bharat et al. |

(Continued)

FOREIGN PATENT DOCUMENTS

| | | |
|---|---|---|
| JP | 2007094592 A | 4/2007 |
| KR | 20010028737 A | 4/2001 |

(Continued)

OTHER PUBLICATIONS

Microsoft Computer Dictionary, p. 181 (Microsoft Press, 5th ed., 2002).*

(Continued)

*Primary Examiner* — Frank D Mills
(74) *Attorney, Agent, or Firm* — Perkins Coie LLP (57) ABSTRACT

Among other disclosure, computer-implemented methods and computer program products for obtaining data from a page. A method can include initiating a harvesting process for a page available in a computer system. The method can include identifying a feed representation that has been created for the page. The method can include retrieving and storing, as part of the harvesting process, at least a portion from the page based on information in the identified feed representation. The feed representation can include at least excerpts of content from the page. The feed representation can include at least one representation selected from: an RSS feed, an Atom feed, an XML feed, an RDF feed, a serialized data feed representation, and combinations thereof.

19 Claims, 4 Drawing Sheets

(56) References Cited

U.S. PATENT DOCUMENTS

| | | |
|---|---|---|
| 6,499,021 B1 | 12/2002 | Abu-Hakima et al. |
| 6,513,059 B1 | 1/2003 | Gupta et al. |
| 6,516,315 B1 | 2/2003 | Gupta |
| 6,530,083 B1 | 3/2003 | Liebenow |
| 6,643,650 B1 | 11/2003 | Slaughter et al. |
| 6,654,741 B1 | 11/2003 | Cohen et al. |
| 6,704,729 B1 | 3/2004 | Klein et al. |
| 6,711,585 B1 | 3/2004 | Copperman et al. |
| 6,741,744 B1 | 5/2004 | Hsu |
| 6,748,441 B1 | 6/2004 | Gemmell |
| 6,789,077 B1 | 9/2004 | Slaughter et al. |
| 6,816,850 B2 | 11/2004 | Culliss |
| 6,816,857 B1 | 11/2004 | Weissman et al. |
| 6,839,701 B1 | 1/2005 | Baer et al. |
| 6,847,974 B2 | 1/2005 | Wachtel |
| 6,859,807 B1 | 2/2005 | Knight et al. |
| 6,868,447 B1 | 3/2005 | Slaughter et al. |
| 6,996,566 B1 | 2/2006 | George et al. |
| 7,072,883 B2 | 7/2006 | Potok et al. |
| 7,092,928 B1 | 8/2006 | Elad et al. |
| 7,093,200 B2 | 8/2006 | Schreiber et al. |
| 7,177,798 B2 | 2/2007 | Hsu et al. |
| 7,185,075 B1 | 2/2007 | Mishra et al. |
| 7,197,451 B1 | 3/2007 | Carter et al. |
| 7,200,862 B2 | 4/2007 | Murching et al. |
| 7,216,002 B1 | 5/2007 | Anderson |
| 7,246,164 B2 | 7/2007 | Lehmann et al. |
| 7,260,573 B1 | 8/2007 | Jeh et al. |
| 7,284,196 B2 | 10/2007 | Skeen et al. |
| 7,343,365 B2 | 3/2008 | Farnham et al. |
| 7,398,261 B2 | 7/2008 | Spivack et al. |
| 7,433,876 B2 | 10/2008 | Spivack et al. |
| 7,516,401 B2 | 4/2009 | Chen et al. |
| 7,536,323 B2 | 5/2009 | Hsieh |
| 7,584,208 B2 | 9/2009 | Spivack et al. |
| 7,640,267 B2 | 12/2009 | Spivack et al. |
| 7,707,161 B2 | 4/2010 | Hall et al. |
| 7,730,094 B2 | 6/2010 | Kaler et al. |
| 7,739,121 B2 | 6/2010 | Jain et al. |
| 7,769,742 B1 * | 8/2010 | Brawer et al. ................ 707/709 |
| 7,774,380 B2 | 8/2010 | Burke et al. |
| 7,793,209 B2 | 9/2010 | Kikuchi |
| 7,814,111 B2 | 10/2010 | Levin |
| 7,895,235 B2 | 2/2011 | Baeza-Yates et al. |
| 7,933,914 B2 | 4/2011 | Ramsey et al. |
| 7,937,582 B1 * | 5/2011 | Lee ............................. 713/155 |
| 7,966,564 B2 | 6/2011 | Catlin et al. |
| 8,020,206 B2 | 9/2011 | Hubbard et al. |
| 8,046,227 B2 | 10/2011 | Starkie |
| 8,103,676 B2 | 1/2012 | Bedrax-Weiss et al. |
| 8,135,704 B2 * | 3/2012 | Hyder et al. ................ 707/722 |
| 8,135,831 B2 | 3/2012 | Sinclair et al. |
| 8,150,859 B2 | 4/2012 | Vadlamani et al. |
| 8,161,066 B2 | 4/2012 | Spivack et al. |
| 8,166,010 B2 | 4/2012 | Ives |
| 8,176,079 B1 | 5/2012 | Spertus |
| 8,190,684 B2 | 5/2012 | Spivack et al. |
| 8,200,617 B2 | 6/2012 | Spivack et al. |
| 8,275,796 B2 | 9/2012 | Spivack et al. |
| 8,438,124 B2 | 5/2013 | Spivack et al. |
| 8,688,742 B2 | 4/2014 | Fischer et al. |
| 2001/0049700 A1 | 12/2001 | Ichikura |
| 2002/0023122 A1 * | 2/2002 | Polizzi et al. ................ 709/202 |
| 2002/0049689 A1 | 4/2002 | Venkatram |
| 2002/0052894 A1 | 5/2002 | Bourdoncle et al. |
| 2002/0055936 A1 | 5/2002 | Cheng et al. |
| 2002/0059223 A1 | 5/2002 | Nash et al. |
| 2002/0069100 A1 | 6/2002 | Arberman |
| 2002/0077803 A1 | 6/2002 | Kudoh et al. |
| 2002/0082900 A1 | 6/2002 | Johnson |
| 2002/0103777 A1 | 8/2002 | Zhang |
| 2002/0103920 A1 | 8/2002 | Berkun et al. |
| 2002/0147748 A1 | 10/2002 | Huang et al. |
| 2002/0161626 A1 | 10/2002 | Plante et al. |
| 2002/0184111 A1 | 12/2002 | Swanson |
| 2002/0194154 A1 | 12/2002 | Levy et al. |
| 2002/0194201 A1 | 12/2002 | Wilbanks et al. |
| 2003/0028871 A1 | 2/2003 | Wang et al. |
| 2003/0046344 A1 | 3/2003 | Kumhyr et al. |
| 2003/0074356 A1 | 4/2003 | Kaler et al. |
| 2003/0093551 A1 | 5/2003 | Taylor et al. |
| 2003/0120730 A1 | 6/2003 | Kuno et al. |
| 2003/0126136 A1 | 7/2003 | Omoigui |
| 2003/0133556 A1 | 7/2003 | Naik et al. |
| 2003/0144892 A1 | 7/2003 | Cowan et al. |
| 2003/0144988 A1 | 7/2003 | Nareddy et al. |
| 2003/0149934 A1 | 8/2003 | Worden |
| 2003/0163513 A1 | 8/2003 | Schaeck et al. |
| 2003/0208472 A1 | 11/2003 | Pham |
| 2004/0012773 A1 | 1/2004 | Puttkammer |
| 2004/0054671 A1 | 3/2004 | Cohen et al. |
| 2004/0073430 A1 | 4/2004 | Desai et al. |
| 2004/0083199 A1 | 4/2004 | Govindugari et al. |
| 2004/0083211 A1 | 4/2004 | Bradford |
| 2004/0088325 A1 | 5/2004 | Elder et al. |
| 2004/0111386 A1 | 6/2004 | Goldberg et al. |
| 2004/0158455 A1 | 8/2004 | Spivack et al. |
| 2004/0162773 A1 | 8/2004 | Del Rey et al. |
| 2004/0181525 A1 | 9/2004 | Itzhak et al. |
| 2004/0181604 A1 | 9/2004 | Immonen |
| 2004/0194181 P1 | 9/2004 | Iwaki |
| 2004/0210602 A1 | 10/2004 | Hillis et al. |
| 2004/0220893 A1 | 11/2004 | Spivack et al. |
| 2004/0230572 A1 | 11/2004 | Omoigui |
| 2004/0230676 A1 | 11/2004 | Spivack et al. |
| 2004/0249795 A1 | 12/2004 | Brockway et al. |
| 2004/0260680 A1 | 12/2004 | Best et al. |
| 2004/0260701 A1 | 12/2004 | Lehikoinen et al. |
| 2005/0015357 A1 | 1/2005 | Shahidi |
| 2005/0021862 A1 | 1/2005 | Schroeder et al. |
| 2005/0027708 A1 | 2/2005 | Mueller et al. |
| 2005/0055644 A1 | 3/2005 | Stockton |
| 2005/0080775 A1 | 4/2005 | Colledge et al. |
| 2005/0086206 A1 | 4/2005 | Balasubramanian et al. |
| 2005/0114487 A1 | 5/2005 | Peng et al. |
| 2005/0131778 A1 | 6/2005 | Bennett et al. |
| 2005/0144158 A1 | 6/2005 | Capper et al. |
| 2005/0144162 A1 | 6/2005 | Liang |
| 2005/0149510 A1 | 7/2005 | Shafrir |
| 2005/0154746 A1 | 7/2005 | Liu et al. |
| 2005/0160065 A1 | 7/2005 | Seeman |
| 2005/0165743 A1 | 7/2005 | Bharat et al. |
| 2005/0210000 A1 | 9/2005 | Michard |
| 2005/0267872 A1 | 12/2005 | Galai et al. |
| 2005/0278309 A1 * | 12/2005 | Evans et al. ................ 707/3 |
| 2005/0278390 A1 | 12/2005 | Kaler et al. |
| 2006/0004703 A1 | 1/2006 | Spivack et al. |
| 2006/0004732 A1 | 1/2006 | Odom |
| 2006/0004892 A1 | 1/2006 | Lunt et al. |
| 2006/0020596 A1 | 1/2006 | Liu et al. |
| 2006/0026147 A1 | 2/2006 | Cone et al. |
| 2006/0074726 A1 | 4/2006 | Forbes et al. |
| 2006/0085788 A1 | 4/2006 | Amir et al. |
| 2006/0151507 A1 | 7/2006 | Swartz et al. |
| 2006/0168510 A1 * | 7/2006 | Bryar et al. ................ 715/511 |
| 2006/0184617 A1 | 8/2006 | Nicholas et al. |
| 2006/0200434 A1 | 9/2006 | Flinn et al. |
| 2006/0200478 A1 * | 9/2006 | Pasztor et al. ................ 707/100 |
| 2006/0213976 A1 * | 9/2006 | Inakoshi et al. ............. 235/380 |
| 2006/0230011 A1 * | 10/2006 | Tuttle et al. ................ 706/62 |
| 2006/0235873 A1 | 10/2006 | Thomas |
| 2006/0242013 A1 | 10/2006 | Agarwal et al. |
| 2006/0242574 A1 | 10/2006 | Richardson et al. |
| 2006/0248045 A1 | 11/2006 | Toledano et al. |
| 2006/0259357 A1 | 11/2006 | Chiu |
| 2006/0287989 A1 * | 12/2006 | Glance ........................ 707/3 |
| 2007/0016771 A1 | 1/2007 | Allison et al. |
| 2007/0027865 A1 | 2/2007 | Bartz et al. |
| 2007/0038610 A1 | 2/2007 | Omoigui |
| 2007/0038643 A1 * | 2/2007 | Epstein ........................ 707/10 |
| 2007/0050338 A1 | 3/2007 | Strohm et al. |
| 2007/0061198 A1 | 3/2007 | Ramer et al. |
| 2007/0081197 A1 | 4/2007 | Omoigui |
| 2007/0118802 A1 | 5/2007 | Gerace et al. |

(56) References Cited

U.S. PATENT DOCUMENTS

| | | | |
|---|---|---|---|
| 2007/0124202 | A1 | 5/2007 | Simons |
| 2007/0143502 | A1* | 6/2007 | Garcia-Martin et al. ...... 709/246 |
| 2007/0174270 | A1 | 7/2007 | Goodwin et al. |
| 2007/0179954 | A1 | 8/2007 | Kudoh et al. |
| 2007/0208703 | A1 | 9/2007 | Shi et al. |
| 2007/0208714 | A1 | 9/2007 | Ture et al. |
| 2007/0220893 | A1 | 9/2007 | Woltmann et al. |
| 2007/0260598 | A1 | 11/2007 | Odom |
| 2008/0010291 | A1 | 1/2008 | Poola et al. |
| 2008/0010292 | A1 | 1/2008 | Poola |
| 2008/0021924 | A1 | 1/2008 | Hall et al. |
| 2008/0034058 | A1* | 2/2008 | Korman et al. ............... 709/217 |
| 2008/0059519 | A1 | 3/2008 | Grifftih |
| 2008/0091656 | A1 | 4/2008 | Charnock et al. |
| 2008/0109212 | A1 | 5/2008 | Witbrock et al. |
| 2008/0148193 | A1 | 6/2008 | Moetteli |
| 2008/0235383 | A1 | 9/2008 | Schneider |
| 2008/0243838 | A1 | 10/2008 | Scott et al. |
| 2008/0262964 | A1 | 10/2008 | Bezos et al. |
| 2008/0270428 | A1 | 10/2008 | McNamara et al. |
| 2008/0306959 | A1 | 12/2008 | Spivack et al. |
| 2009/0030982 | A1 | 1/2009 | Spivack et al. |
| 2009/0076887 | A1 | 3/2009 | Spivack et al. |
| 2009/0077062 | A1 | 3/2009 | Spivack et al. |
| 2009/0077094 | A1 | 3/2009 | Bodain |
| 2009/0077124 | A1 | 3/2009 | Spivack et al. |
| 2009/0077531 | A1 | 3/2009 | Miloslavsky et al. |
| 2009/0089278 | A1 | 4/2009 | Poola et al. |
| 2009/0089286 | A1 | 4/2009 | Kumar et al. |
| 2009/0106307 | A1 | 4/2009 | Spivack |
| 2009/0138565 | A1 | 5/2009 | Shiff et al. |
| 2009/0144240 | A1 | 6/2009 | Singh et al. |
| 2009/0144612 | A1 | 6/2009 | Ishii et al. |
| 2009/0171984 | A1 | 7/2009 | Park et al. |
| 2009/0192972 | A1 | 7/2009 | Spivack et al. |
| 2009/0234711 | A1 | 9/2009 | Ramer et al. |
| 2009/0254414 | A1 | 10/2009 | Schwarz et al. |
| 2009/0254971 | A1 | 10/2009 | Herz et al. |
| 2009/0327304 | A1 | 12/2009 | Agarwal et al. |
| 2010/0004975 | A1 | 1/2010 | White et al. |
| 2010/0046842 | A1 | 2/2010 | Conwell |
| 2010/0049842 | A1 | 2/2010 | Koski |
| 2010/0057815 | A1 | 3/2010 | Spivack et al. |
| 2010/0070448 | A1 | 3/2010 | Omoigui |
| 2010/0070542 | A1 | 3/2010 | Feinsmith |
| 2010/0100545 | A1 | 4/2010 | Jeavons |
| 2010/0153160 | A1 | 6/2010 | Bezemer et al. |
| 2010/0235918 | A1 | 9/2010 | Mizrahi et al. |
| 2010/0262592 | A1 | 10/2010 | Brawer et al. |
| 2010/0268596 | A1 | 10/2010 | Wissner et al. |
| 2010/0268700 | A1 | 10/2010 | Wissner et al. |
| 2010/0268702 | A1 | 10/2010 | Wissner et al. |
| 2010/0268720 | A1 | 10/2010 | Spivack et al. |
| 2011/0066525 | A1 | 3/2011 | Hulst et al. |

FOREIGN PATENT DOCUMENTS

| | | | |
|---|---|---|---|
| KR | 1020040017824 | | 2/2004 |
| KR | 20050023583 | A | 3/2005 |
| KR | 1020060046522 | | 5/2006 |
| KR | 20060117707 | | 11/2006 |
| KR | 20070061116 | A | 6/2007 |
| WO | WO-2010120925 | | 10/2010 |
| WO | WO-2010120929 | | 10/2010 |
| WO | WO-2010120934 | | 10/2010 |
| WO | WO-2010120941 | | 10/2010 |

OTHER PUBLICATIONS

Fry, John, and Artificial Intelligence Center. "Assembling a parallel corpus from RSS news feeds." In MT Summit X, p. 59. 2005.*

International Search Report PCT/US2008/010337 dated Dec. 28, 2009; pp. 1-3.

International Search Report PCT/US2009/002867 dated Dec. 18, 2009; pp. 1-3.

Written Opinion PCT/US2009/002867 dated Dec. 18, 2009; pp. 1-5.

Written Opinion PCT/US2008/010337 dated Dec. 28, 2009; pp. 1-3.

"Improved markup language for semantic Web using object oriented technology, 21-24"—Kangchan, et al., IEEE, vol. 1, Sep. 2003 (pp. 330-334).

"Re-integrating the research record"—Myers, et al., IEEE vol. 5, May-Jun. 2003 (pp. 44-50).

International Search Report PCT/US2008/010596 dated Mar. 24, 2009.

International Search Report PCT/US2008/011474 dated May 29, 2009.

International Search Report, PCT/US07/75379, (Aug. 5, 2008).

'A klog apart' [online]. Dijest.com 2003. [retrieved on May 3, 2007]. Retrieved from the Internet:<URL:htt://www.dijest.com/aka/2003/06/20.html>, 9 pages.

'Blogs as information spaces' [on-line]. Reflective Surface, 2003, [retrieved on May 3, 2007]. Retrieved from the Internet:< URL: http://log.reflectivesurface.com/2003/12/>, 6 pages.

Cass, "A Fountain of Knowledge," IEEE Spectrum, Jan. 2004, pp. 68-75.

'Development Notebook' [online]. Dannyayers, 2003, [retrieved on May 4, 2007]. Retrieved from the Internet: URL: webarchive.org/web/20031012055838/http://dannyayers.com/ideagraph-blog/archives/cat_jemblog.html>, 6 pages.

"Ontology-Driven Peer Profiling in Peer-to-Peer Enabled Semantic Web"—Olena Parhomenko, Yugyung Lee, E.K. Park—CIKM'03 Information and Knowledge Management Nov. 2003 (pp. 564-567).

'Organizing weblogs by topic' [online]. Read/Write Web, 2003, [retrieved on May 3, 2007]. Retrieved from the Internet: <URL: http://www.readwriteweb.com/archives/organizing_webl.php>, 3 pages.

"SEAL—A Framework for Developing SEmanatic PortALS"—Nenad Stojanovic, Aleanander Maedche, Steffen Staab, Rudi Studer and York Sure, K=CAP'01', Oct. 22-23, 2001 ACM (pp. 155-162).

"Semantic-Based Approach to Component Retrieval"—Vijayan Sugumaran and Veda C. Storey—ACM SIGMIS Database vol. 24, Issue 3 Aug. 2003 (pp. 8-24).

'Semantic Email' [online]. University of Washington, [retrieved on May 3, 2007]. Retrieved from thee Internet:<URL:http://www.cs.washington.edu/research/semweb/email.html>, 2 pages.

'Semantic link' [online]. Meta, 2005 [retrieved on May 3, 2007]. Retrieved on the Internet:<URL: http://meta.wikimedia.org/wiki/Semantic_link>, 1 page.

Written Opinion PCT/US2010/031090 dated Nov. 2, pp. 1-6.

Milos Kudelka, et al., "Semantic Annotation of Web Pages Using Web Patterns", IEEE/WIC/ACM/ International Conference on Web Intelligence, pp. 1-12, Dec. 18, 2006.

International Search Report PCT/US2010/031096 dated Nov. 22, 2010; pp. 1-3.

International Search Report PCT/US2010/031101dated Nov. 26, 2010; pp. 1-3.

International Search Report PCT/US2010/031111 dated Nov. 26, 2010; pp. 1-3.

International Search Report PCT/US2010/039381 dated Jan. 5, 2011 pp. 1-3.

Non-Final Office Action mailed Nov. 29, 2010 in U.S. Appl. No. 11/874,881, filed Oct. 18, 2007.

European Supplementary Search Report EP 08 839486.1 Dated Dec. 27, 2010 pp. 1-8.

U.S. Appl. No. 12/819,999, filed Jun. 21, 2010.

U.S. Appl. No. 60/546,794, filed Feb. 23, 2004.

U.S. Appl. No. 60/427,550, filed Nov. 20, 2002.

U.S. Appl. No. 60/821,891, filed Aug. 9, 2006.

U.S. Appl. No. 60/972,815, filed Sep. 16, 2007.

U.S. Appl. No. 60/981,104, filed Oct. 18, 2007.

U.S. Appl. No. 61/169,662, filed Apr. 15, 2009.

U.S. Appl. No. 61/169,669, filed Apr. 15, 2009.

U.S. Appl. No. 61/169,677, filed Apr. 15, 2009.

U.S. Appl. No. 61/218,709, filed Jun. 19, 2009.

Written Opinion PCT/US2010/031096 dated Nov. 22, 2010dated; pp. 1-4.

Written Opinion PCT/US2010/031101 dated Nov. 26, 2010dated; pp. 1-4.

(56) References Cited

OTHER PUBLICATIONS

Written Opinion PCT/US2010/031111 dated Nov. 26, 2010dated; pp. 1-6.
Written Opinion PCT/US2010/039381 dated Jan. 5, 2011 pp. 1-4.
Final Office Action mailed May 11, 2011 for U.S. Appl. No. 11/874,881, filed Oct. 18, 2007, 31 pages.
Final Office Action mailed Apr. 25, 2011 for U.S. Appl. No. 12/616,085, filed Nov. 10, 2009, 32 pages.
Non-Final Office Action mailed May 11, 2011 for U.S. Appl. No. 11/874,882, filed Oct. 18, 2007, 30 pages.
Restriction Requirement mailed Mar. 10, 2011 for U.S. Appl. No. 11/874,882, filed Oct. 18, 2007, 5 pages.
Non-Final Office Action mailed Mar. 18, 2011 in U.S. Appl. No. 12/359,236, filed Jan. 23, 2009, 33 pages.
Choi, Y. et al., "Refinement Method of Post-Processing and Training for Improvement of Automated Text Classification," Computational Science and its Applications—ICCSA 2006: International Conference, Glasgow, UK, May 8-11, 2006, pp. 298-308.
Restriction Requirement mailed Jul. 26, 2011 for U.S. Appl. No. 12/244,740, filed Oct. 2, 2008, 5 pages.
Restriction Requirement mailed Aug. 5, 2011 in U.S. Appl. No. 12/168,034, filed Jul. 3, 2008, 10 pages.
Final Office Action mailed Aug. 17, 2011 for U.S. Appl. No. 12/616,085, filed Nov. 10, 2009, 23 pages.
Final Office Action mailed Aug. 17, 2011 for U.S. Appl. No. 12/197,207, filed Aug. 22, 2008, 41 pages.
Non Final Office Action mailed Jul. 27, 2011 for U.S. Appl. No. 12/489,352, filed Jun. 22, 2009, 28 pages.
Final Office Action mailed May 26, 2011 in U.S. Appl. No. 11/873,388, filed Oct. 16, 2007, 28 pages.
Advisory Action mailed Oct. 20, 2011 for U.S. Appl. No. 11/874,881, 3 pages.
U.S. Appl. No. 11/873,388, filed Oct. 16, 2007.
U.S. Appl. No. 11/874,881, filed Oct. 18, 2007.
U.S. Appl. No. 11/874,882, filed Oct. 18, 2007.
U.S. Appl. No. 12/168,034, filed Jul. 3, 2008.
U.S. Appl. No. 12/244,740, filed Oct. 2, 2008.
U.S. Appl. No. 10/719,002, filed Nov. 20, 2003.
U.S. Appl. No. 12/616,085, filed Nov. 10, 2009.
U.S. Appl. No. 10/719,652, filed Nov. 20, 2003.
U.S. Appl. No. 10/720,031, filed Nov. 20, 2003.
U.S. Appl. No. 12/359,236, filed Jan. 23, 2009.
U.S. Appl. No. 12/359,230, filed Jan. 23, 2009.
U.S. Appl. No. 11/062,125, filed Feb. 19, 2005.
U.S. Appl. No. 12/197,207, filed Aug. 22, 2008.
U.S. Appl. No. 11/835,079, filed Aug. 7, 2007.
U.S. Appl. No. 12/104,366, filed Apr. 16, 2008.
U.S. Appl. No. 12/760,387, filed Apr. 14, 2010.
U.S. Appl. No. 12/760,411. filed Apr. 14, 2010.
U.S. Appl. No. 12/760,424, filed Apr. 14, 2010.
U.S. Appl. No. 12/489,352, filed Jun. 22, 2009.
Non-Final Office Action mailed May 22, 2006 for Issued Patent No. 7,640,267, U.S. Appl. No. 10/719,002, filed Nov. 11, 2003.
Non-Final Office Action mailed Nov. 16, 2006 for Issued Patent No. 7,640, 267, U.S. Appl. No. 10/719,002, filed Nov. 20, 2003.
Final Office Action mailed May 1, 2007 for Issued Patent No. 7,640,267, U.S. Appl. No. 10/719,002, filed Nov. 20, 2003.
Appeals Conference mailed Proceed to BPAI mailed Oct. 17, 2007 for Issued Patent No. 7,640,267, U.S. Appl. No. 10/719,002, filed Nov. 20, 2003.
Non-Final Office Action mailed Feb. 20, 2008 for Issued Patent No. 7,640,267, U.S. Appl. No. 10/719,002, filed Nov. 20, 2003.
Final Office Action mailed Aug. 5, 2008 for Issued Patent No. 7,640,267, U.S. Appl. No. 10/719,002, filed Nov. 20, 2003.
Advisory Action mailed Oct. 17, 2008 for Issued Patent No. 7,640,267, U.S. Appl. No. 10/719,002, filed Nov. 20, 2003.
Non-Final Office Action mailed Feb. 3, 2009 for Issued Patent No. 7,640,267, U.S. Appl. No. 10/719,002, filed Nov. 20, 2003.
Restriction Requirement mailed May 26, 2009 for Issued Patent No. 7,640,267, U.S. Appl. No. 10/719,002, filed Nov. 20, 2003.
Notice of Allowance mailed Sep. 16, 2009 for Issued patent No. 7,640,267, U.S. Appl. No. 10/719,002, filed Nov. 20, 2003.
Notice of Allowance mailed Nov. 4, 2009 for Issued Patent No. 7,640,267, U.S. Appl. No. 10/719,002, filed Nov. 20, 2003.
Non-Final Office Action mailed Feb. 7, 2007 for Issued Patent No. 7,398,261, U.S. Appl. No. 10/719,652, filed Nov. 20, 2003.
Non-Compliant or Non-Responsive Amendment mailed Nov. 20, 2007 for Issued Patent No. 7,398,261, U.S. Appl. No. 10,719,652, filed Nov. 20, 2003.
Notice of Allowance mailed Mar. 25, 2008 for Issued Patent No. 7,398,261, U.S. Appl. No. 10/719,652, filed Nov. 2003.
Non-Final Office Action mailed May 5, 2006 for Issued Patent No. 7,584,208, U.S. Appl. No. 10/720,031, filed Nov. 20, 2003.
Final Office Action mailed Oct. 20, 2006 for Issued Patent No. 7,584,208, U.S. Appl. No. 10/720,031, filed Nov. 20, 2003.
Non-Final Office Action mailed Aug. 9, 2007 for Issued Patent No. 7,584,208, U.S. Appl. No. 10/720,031, filed Nov. 20, 2003.
Final Office Action mailed Jan. 25, 2008 for Issued Patent No. 7,584,208, U.S. Appl. No. 10/720,031, filed Nov. 20, 2003.
Non-Final Office Action mailed May 23, 2008 for Issued Patent No. 7,584,208, U.S. Appl. No. 10/720,031, filed Nov. 20, 2003.
Non-Final Office Action mailed Nov. 21, 2008 for Issued Patent No. 7,584,208, U.S. Appl. No. 10/720,031, filed Nov. 20, 2003.
Notice of Allowance mailed May 13, 2009 for Issued Patent No. 7,584,208, U.S. Appl. No. 10/720,031, filed Nov. 20, 2003.
Non-Final Office Action mailed Apr. 14, 2010 in U.S. Appl. No. 12/359,230, filed Jan. 23, 2009.
Non-Final Office Action mailed Jun. 1, 2007 for Issued Patent No. 7,433,876, U.S. Appl. No. 11/062,125, filed Feb. 19, 2005.
Final Office Action mailed Nov. 9, 2007 for Issued Patent No. 7,433,876, U.S. Appl. No. 11/062,125, filed Feb. 19, 2005.
Advisory Action mailed Dec. 27, 2007 for Issued Patent No. 7,433,876, U.S. Appl. No. 11/062,125, filed Feb. 19, 2005.
Non-Final Office Action mailed Feb. 21, 2008 for Issued Patent No. 7,433,876, U.S. Appl. No. 11/062,125, filed Feb. 19, 2005.
Notice of Allowance mailed Jun. 26, 2008 for Issued Patent No. 7,433,876, U.S. Appl. No. 11/062,125, filed Feb. 19, 2005.
Non-Final Office Action mailed Feb. 3, 2010 in U.S. Appl. No. 12/104,366, filed Apr. 16, 2008.
Final Office Action mailed Jul. 16, 2010 in U.S. Appl. No. 12/104,366, filed Apr. 16, 2008.
Non-Final Office Action mailed Aug. 25, 2010 in U.S. Appl. No. 11/835,079, filed Aug. 7, 2007.
Final Office Action mailed Feb. 14, 2011 in U.S. Appl. No. 11/835,079, filed Aug. 7, 2007, 63 pages.
Non-Final Office Action mailed Sep. 16, 2010 in U.S. Appl. No. 11/873,388, filed Oct. 16, 2007.
Restriction Requirement mailed Jul. 23, 2010 in U.S. Appl. No. 11/874,881, filed Oct. 18, 2007.
Final Office Action mailed Sep. 29, 2010 in U.S. Appl. No. 12/359,230, filed Jan. 23, 2009.
Non-Final Office Action mailed Sep. 17, 2010 in U.S. Appl. No. 12/616,085, filed Nov. 10, 2009.
International Search Report and Written Opinion PCT/US2008/010337 dated Dec. 28, 2009, pp. 1-10.
International Search Report and Written Opinion PCT/US2009/002867 dated Dec. 18, 2009; pp. 1-12.
International Search Report PCT/US07/75379; dated Aug. 5, 2008.
Written Opinion PCT/US2007/75379 dated Aug. 5, 2008, pp. 1-7.
International Search Report PCT/US2008/010596 dated Mar. 24, 2009, pp. 1-2.
Written Opinion PCT/US208/010596 dated Mar. 24, 2009, pp. 1-5.
International Search Report PCT/US2008/011474 dated May 29, 2009, pp. 1-2.
Written Opinion PCT/US2008/011474 dated May 29, 2009, pp. 1-5.
International Search Report PCT/US2010/031090 dated Nov. 2, 2010; pp. 1-3.

(56) References Cited

OTHER PUBLICATIONS

Written Opinion PCT/US2010/031090; dated Nov. 2, 2010; pp. 1-6.
Written Opinion PCT/US2010/031111 dated Nov. 26, 2010; pp. 1-6.
A. Hotho et al., "Information Retrieval in Folksonomies: Search and Ranking," ESWC 2006, pp. 411-426.
Kashyap et al., "Semantic and Schematic Similarities Between Database Objects: a Context-Based Approach," VLUB Journal, © Springer-Verlag 1996, pp. 1-29.
S. Decker and M. Frank, "The Social Semantic Desktop," DERI Technical Report 2004-05-02, May 2004, pp. 1-7.
W. Fang et al., "Toward a Semantic Search Engine Based on Ontologies," Proc. 4th Int'l Conf. on Mach. Learning and Cybernetics, Aug. 2005, pp. 1913-1918.
X. Shen, B. Tan, and X. Zhai, "Context-sensitive information retrieval using implicit feedback," Proc. SIGIR '05, pp. 43-50.
Lee et al., "Development of a Concurrent Mold Design System: a Knowledge-based Approach," Computer Integrated Manufacturing Systems, vol. 10, Issue 4, Oct. 1997, pp. 287-307.
Devedžić, "A Survey of Modern Knowledge Modeling Techniques," Expert Systems with Applications, vol. 17, Issue 4, Nov. 1999, pp. 275-294.

\* cited by examiner

HARVESTING DATA FROM PAGE

This patent application claims priority from provisional patent application Ser. No. 60/821,891, filed Aug. 9, 2006 and entitled "HARVESTING DATA FROM PAGE", the entire contents of which are incorporated herein by reference.

TECHNICAL FIELD

This document relates to harvesting data from a page.

BACKGROUND

Current approaches for harvesting content from web pages face the situation that each site and page can have a unique layout comprised of multiple components in various places, such as content sections, ads, frames, columns, content boxes, page content that is divided into sub-divisions or sub-objects, web page sub-components, content articles that run or continue across several sections or pages, etc. In response to this situation, present tools for crawling and mining content from such pages have sometimes needed to be specifically programmed for the unique layout and structure of each site and/or page so that they know where the content of interest is located in the layout for that site. In other words, the programming tells the tool what parts of the page represent content to keep, and content to discard, and what sections of the page correspond to various types of content. For example, when mining a news site, it may be desired to collect and operate on the body text of the news articles in the site, but to ignore the ads and other sidebar content, etc. Existing approaches in this regard have involved programming specific mining agents, or programming a general agent with specific rules or templates. Moreover, such programming often need to be kept up to date for each site and/or page as the content and structure of the sites and pages change over time. This can be a labor intensive process that does not scale well to mining very large numbers of sites/pages with differing layouts and structure. Another existing solution uses statistical or natural language processing methods, or machine learning methods, to try to figure out automatically which parts of sites and pages should be kept and which should be discarded, and which parts of sites and pages correspond to various types of content.

SUMMARY

The invention relates to harvesting data from a page.

Some implementations of the present invention relate to automatically determining which parts of a website and/or web page comprise the "important" or "targeted" text to mine.

In a first aspect, a computer-implemented method for obtaining data from a page includes initiating a harvesting process for a page available in a computer system. The method includes identifying a feed representation that has been created for the page. The method includes retrieving and storing, as part of the harvesting process, at least a portion from the page based on information in the identified feed representation.

Implementations can include any, all or none of the following features. The method can further include identifying, before retrieving the portion of the page, at least a part of the feed representation to be used for retrieving the portion from the page, the part of the feed representation including the information. The method can further include using the identified part of the feed representation to identify the portion of the page as matching the information in the feed representation. Using the identified part of the feed representation can include comparing the identified part of the feed representation with contents of the page. The feed representation can include at least excerpts of content from the page. The feed representation can include at least one representation selected from: an RSS feed, an Atom feed, an XML feed, an RDF feed, a serialized data feed representation, and combinations thereof. The method can further include identifying at least one feed entry in the feed representation, the feed entry relating to a portion of the page that links to another page; determining a URL of the other page; retrieving page content from the other page using the determined URL; and identifying, in the retrieved page content, the portion of the page as matching content from the identified feed entry. Retrieving the portion from the page based on the information can include using a text recognition technique. The method can further include determining, using the identified feed representation, which content from the page not to retrieve in the harvesting process; and identifying the portion from the page as not being included in the determined content of the page not to retrieve. The method can further include causing the determined content of the page not to be retrieved in the harvesting process.

In a second aspect, a computer program product is tangibly embodied in a computer-readable medium and includes instructions that when executed by a processor perform a method for obtaining data from a page. The method includes initiating a harvesting process for a page available in a computer system. The method includes identifying a feed representation that has been created for the page. The method includes retrieving and storing, as part of the harvesting process, at least a portion from the page based on information in the identified feed representation.

In a third aspect, a computer-implemented method for obtaining data from a page includes identifying a page as a target for content retrieval, the page including multiple content portions. The method includes identifying a feed representation that has been created for the identified page, the identified feed representation including multiple feed entries each corresponding to at least some of the multiple content portions. The method includes processing each of the multiple feed entries by: accessing the identified page; identifying any of the multiple content portions that match contents of the feed entry being processed; and retrieving at least one of the multiple content portions based on the identified content portion. The method includes storing, as a result of the content retrieval, each retrieved content portion obtained from the processing of the multiple feed entries.

Implementations can include any, all or none of the following features. At least a first content portion of the multiple content portions can link to another page, and processing a first feed entry of the multiple feed entries relating to the first content portion can include: accessing the other page to which the first content portion links; identifying contents of the accessed other page that match contents of the first feed entry; and retrieving the identified contents of the accessed other page. The feed representation can include at least excerpts of content from the identified page. The feed representation can include at least one representation selected from: an RSS feed, an Atom feed, an XML feed, an RDF feed, a serialized data feed representation, and combinations thereof. Identifying contents of the accessed page that match contents of the feed entry being processed can include using a text recognition technique. The method can further include determining, using the identified feed representation, which content from the identified page not to retrieve in the content retrieval; and identifying the at least one of the multiple content portion as not being included in the determined content of the page not to retrieve. The method can further include causing any of the multiple content portions identified as matching contents of the feed entry being processed not to be retrieved in the content retrieval.

In a fourth aspect, a computer program product is tangibly embodied in a computer-readable medium and includes instructions that when executed by a processor perform a method for obtaining data from a page. The method includes identifying a page as a target for content retrieval, the page including multiple content portions. The method includes identifying a feed representation that that has been created for the identified page, the identified feed representation including multiple feed entries each corresponding to at least some of the multiple content portions. The method includes processing each of the multiple feed entries by: accessing the identified page; identifying any of the multiple content portions that match contents of the feed entry being processed; and retrieving at least one of the multiple content portions based on the identified content portion. The method includes storing, as a result of the content retrieval, each retrieved content portion obtained from the processing of the multiple feed entries.

Advantages of some implementations include: automatically targeting the harvesting activity to the desired content within sites, pages and/or parts of sites or pages; and providing a less labor intensive or computationally intensive approach to mining and harvesting the content of sites and pages with varying structure and content.

DESCRIPTION OF DRAWINGS

Like reference symbols in the various drawings indicate like elements.

DETAILED DESCRIPTION

There will now be described an exemplary implementation that relates to automatically determining which parts of a website and/or web page comprise the "important" body text to mine. The description makes reference to FIG. 1, in which a portion of a web page 100 is shown. For example, the web page 100 is created using a known markup language and is made publicly available at the address http://novaspivack-.typepad.com/ where it can be viewed using a web browser.

Figure 1:
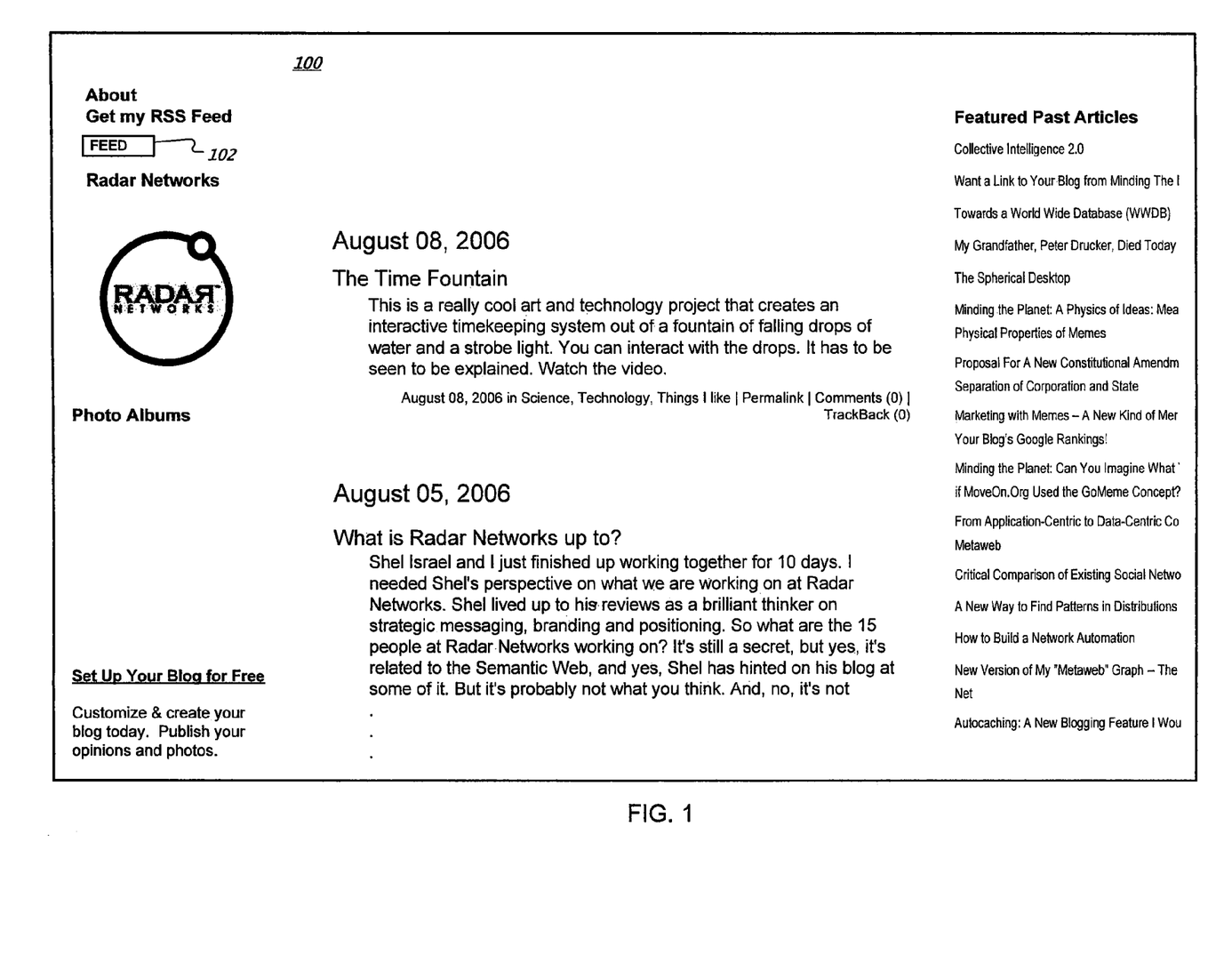
FIG. 1 is an example of a portion of a page from which content can be harvested.

The web page 100 can make selected portions of its content available in a feed representation. For example, the feed representation of a site or page can contain blurbs comprising excerpts (or in some cases, full-text) of the content of the site. A news site's feed, for example, can provide blurbs or full text for each news article in the site or site section it represents. Thus, the feed representation contains some or all of the content that, according to the publisher of the page 100 or another creator of the feed representation, is considered to be "most important" or the "main content" of the page (for example, news articles), compared to other content that is "less important" or "peripheral content" (for example, ads or sections of the page containing comments and/or annotations to the page etc.) that the page may contain, when judged against a standard of relevance. Such a feed representation can be provided using an RSS feed or Atom feed, or other extensible markup language (XML) or rich data format (RDF) feed formats, to name a few examples, or any other type of serialized "data feed" representation of the content. When mentioned herein, RSS refers to protocols or technologies including, but not limited to: RDF Site Summary (sometimes referred to as RSS 0.9, RSS 1.0); Rich Site Summary (sometimes referred to as RSS 0.91, RSS 1.0); and Really Simple Syndication (sometimes referred to as RSS 2.0). Here, the web page 100 includes a link 102 that provides a feed representation of the page 100. The information in such a feed can be used to guide and target mining efforts aimed at page 100.

For example, the feed for the page 100 may have an entry that contains the following excerpt:

TABLE 1

What is Radar Networks up to?
Shel Israel and I just finished up working together for 10 days. I needed Shel's perspective on what we are working on at Radar Networks.

In one implementation, content is harvested as follows. First, the URL to which the feed entry (Table 1) points is determined. In this example, that URL is http://novaspivack-.typepad.com/nova_spivacks_weblog/2006/08/what_am-i_upjo.html. Next, the content from that URL is automatically retrieved. Next, it is determined which part of this page is the "main content" the content that should be mined. This determination is made by identifying the part of the page that matches the text from the feed entry. In this example, that is the part of the page starting with: "What is Radar Networks up to? Shel Israel and I just finished up working together for 10 days. I needed Shel's perspective on what we are working on at Radar Networks." The matching part can be identified using any technique for comparing content, such as text recognition.

In other words, an implementation of a mining agent can automatically look for the part of the page that matches this text and identify it as the part that matters. Rather than the mining agent having to somehow parse or analyze the page to determine which content it should mine, the determination of which part(s) of the page should be mined is made by the content provider, the publisher of the feed, when they decide which content to publish in their feed—the agent simply mines the content portions that are referenced from the feed. In this example, the identified portion is the part of the page that is mined; the rest is ignored. In other implementations, more contents can be mined. Thus, without the agent being specifically programmed for the layout of this particular weblog, the agent can determine where in the layout to find the "important" content that it is supposed to mine.

Such an agent (or methods performed in harvesting operations), can be configured and used with an aim toward harvesting only the main content of a specific site or page, and not the advertisements or other peripheral content. It could also be used conversely to figure out which content to ignore—for example, if the goal is to filter out the main content, so that the peripheral content can be mined, in which case the agent mines everything except what is provided in the feed for a given page.

Figure 2:
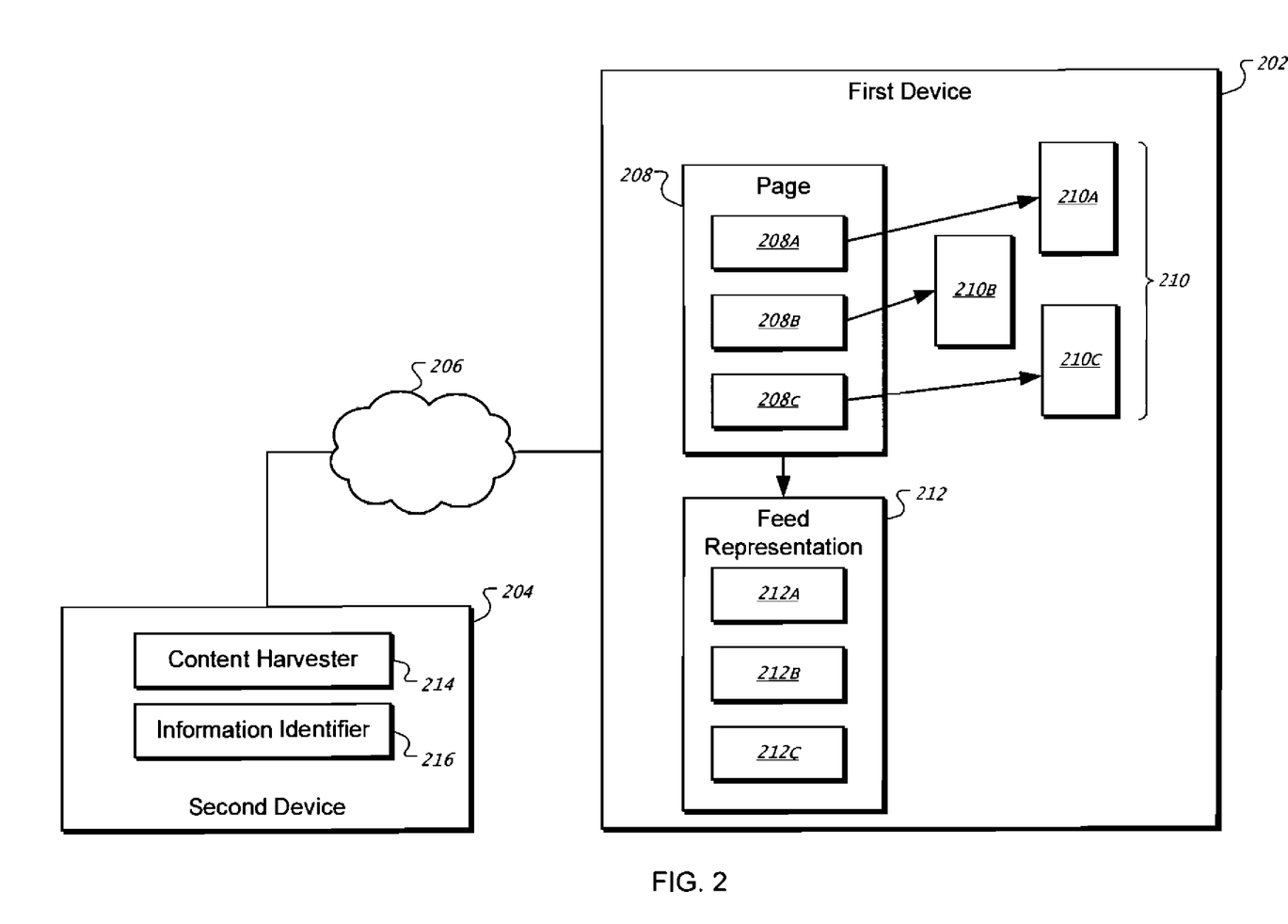
FIG. 2 shows an example of a system that can retrieve content using a feed representation.

FIG. 2 shows an example of a system 200 that can retrieve content using a feed representation. The system 200 here includes a first device 202 and a second device 204. The first and second devices are both connected to at least one network 206, such as the Internet, an intranet or a cellular telephone network, to name a few examples. In some implementations, the first device 202 comprises a server device and the second device comprises a client device, the devices being configured to communicate over the World Wide Web (WWW).

The first device can make one or more pages available, for example to the second device and/or other entities on the network 206. In this example, only a few pages 208 and 210 are shown for clarity, but other implementations can make available dozens, hundreds or millions of pages or more.

Here, the page 208 contains links to the other pages 210. That is, the page 208 includes a portion 208A linking to the page 210A; a portion 208B linking to the page 210B; and a portion 208C linking to the page 210C. Users visiting the page 208 can access any of the pages 210 by activating the corresponding link(s) on the page 208. As other examples, a user can access any of the pages 210 directly by entering its address into a browser or other client program, or by navigating to the page using a link on another page (not shown). For example, the page 208 in some implementations can include the web page 100 (FIG. 1).

In this example, the pages 210 are shown as residing within the same device as the pages 210 (i.e., the first device 202). In other implementations, one or more of the pages 210 can be located on another device or in another system. That is, the pages 210 need not have been published by the same entity as the page 208, or be controlled by that entity.

Here, the first device also makes available a feed representation 212 associated with the page 208. The feed representation can have any of a number of types. In some implementations, the feed representation 212 can be an RSS feed, an Atom feed, an XML feed, an RDF feed, a serialized data feed representation, and combinations thereof. In short, the publisher of the page 208 can provide the feed representation 212 to complement the provision of information through the page 208, for example to highlight selected portions of that page's content. For example, the feed representation 212 in some implementations can include the feed representation for the web page 100 available through the link 102 (FIG. 1).

The feed representation 212 includes at least one or more excerpts of content from the page 208. Here, the feed representation includes a part 212A associated with the portion 218A; a part 212B associated with the portion 218B; and a part 212C associated with the portion 218C. For example, a feed entry in any of the parts 212A-C can include the contents shown in the exemplary Table 1 above.

The second device 204 can be configured for seeking out information available through the network 206 that is of interest according to one or more relevance standards. The second device can also retrieve identified contents and store them temporarily or indefinitely for one or more purposes, such as to perform additional processing on the information, or to forward it to another entity (not shown), to name just a few examples.

Here, the second device includes a content harvester 214 that is configured to perform such content retrieval. For example, the content harvester 214 can initiate a harvesting process for a page available in the computer system 206. The content harvester 214 can provide for storing and/or other processing of the retrieved content.

Here, the second device also includes an information identifier 216 that can identify the information or other content to be retrieved, and pass this information on to the content harvester 214. As one example, the information identifier 216 can identify a feed representation that has been created for the page. As another example, the information identifier 216 can identify at least a part of the feed representation to be used for retrieving a portion from the page. The content harvester 214 can retrieve and store at least a portion from the page based on information in the identified feed representation.

Assume, for example, that a feed entry in the past 212A of the feed representation 212 includes the contents in Table 1 above. The information identifier 216 can use the identified part 212A to identify the portion 208A as matching the information in the feed representation. The information identifier 216 can use any of several techniques in this operation. For example, the information identifier 216 can compare the identified part 212A with contents of the page to identify the portion 208A. As another example, retrieving the portion from the page based on the information can include using a text recognition technique, such as by parsing text in the feed entry and in the page content, and using the text recognition to match the feed entry with the page portion.

With the information identifier 216 having identified, say, the portion 208A as corresponding to an entry in the part 212A of the feed representation 212, the content harvester 214 can in some implementations retrieve at least that portion 208A from the page 208.

In contrast, when the feed entries correspond to a page that links to content on one or more pages, for example like the page 208, the information identifier 216 can determine a page identifier, such as a uniform resource locator (URL) of the other page to which the page links. The content harvester 214 can then retrieve page content from the other page using the determined URL. The information identifier 216 can identify, in the retrieved page content, the portion of the page as matching content from an identified feed entry. Based on the identification, the matching page portion is retrieved in the harvesting process.

The above examples focus on retrieving some or all of the content that has been chosen for inclusion in a feed representation. Other approaches can be used. For example, the feed representation can be used for retrieval of content that has not been chosen for inclusion in a feed representation. This can provide the advantage of helping to avoid information that qualifies as the main or central content of a page according to a relevance standard.

In some implementations, the information identifier 216 can be configured to ignore or omit contents that have entries in the feed representation 212 when identifying portions of the page 208. That is, the information identifier 216 can use the feed representation 212 to determine which content from the page 208 that is not to be retrieved in the harvesting process. For example, the information identifier 216 can find one or more portions of the page 208 that is not included in the feed representation, and also identify such content as being a candidate for retrieval. The content harvester 214 can be configured so that the determined content of the page—i.e., contents that have entries in the feed representation is not retrieved in the harvesting process.

Figure 3:
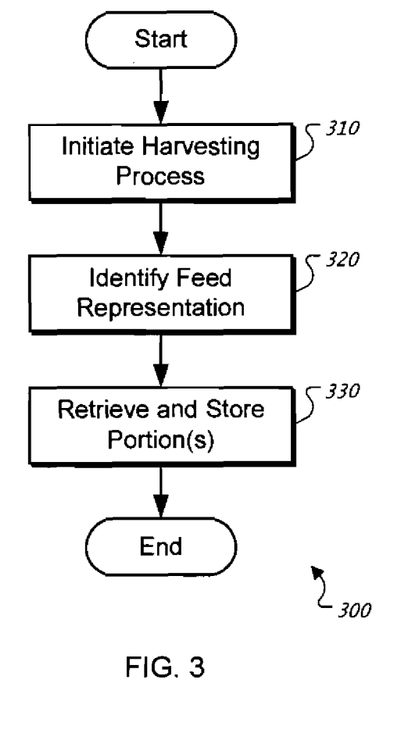
FIG. 3 is an example of a flow chart for a method that can be performed.

FIG. 3 is an example of a flow chart for a method 300 that can be performed. The method 300 can be performed by a processor executing instructions in a computer-readable medium. For example, the method 300 can be performed to obtain data from a page in the system 100 (FIG. 1).

As shown, the method 300 includes a step 310 of initiating a harvesting process for a page available in a computer system. For example, this can involve initiating or launching any or all of the second device 204, the content harvester 214 or the information identifier 216. The harvesting process can be directed to the page 208 and/or to any or all of the pages 210.

The method 300 includes a step 320 of identifying a feed representation that has been created for the page. For example, the information identifier 216 can identify the feed representation 212 as having been created for the page 208.

The method 300 includes a step 330 of retrieving and storing, as part of the harvesting process, at least a portion from the page based on information in the identified feed representation. For example, the content harvester 214 can retrieve any or all of the portions 208A-C from the page 208, and/or any or all contents from any of the pages 210 and store it in the second device 204.

One or more other steps can be performed before, in between, and/or after the steps of the method 300. For example, the second device 204 or another device can be configured to process retrieved content.

As another example, the following is an outline description of an implementation of a harvesting method.
1. Get the RSS or Atom feed for site or page x
   a. For each feed entry, k, in the feed for x,
      i. Get the URL, L, in site x that the entry represents.
      ii. Get the full-content of the web page or file that L represents
      iii. Find the part of that page or file that matches the content in k
         1. Get the content of that part of L
         2. This content is the main content of that page A related example will now be described with reference to FIG. 4, which is another example of a flow chart for a method 400 that can be performed. The method 400 can be performed by a processor executing instructions in a computer-readable medium. For example, the method 400 can be performed to obtain data from a page in the system 100 (FIG. 1). Other examples or implementations of individual steps in the method 400 can also be found in the description above and/or in the drawings.

Figure 4:
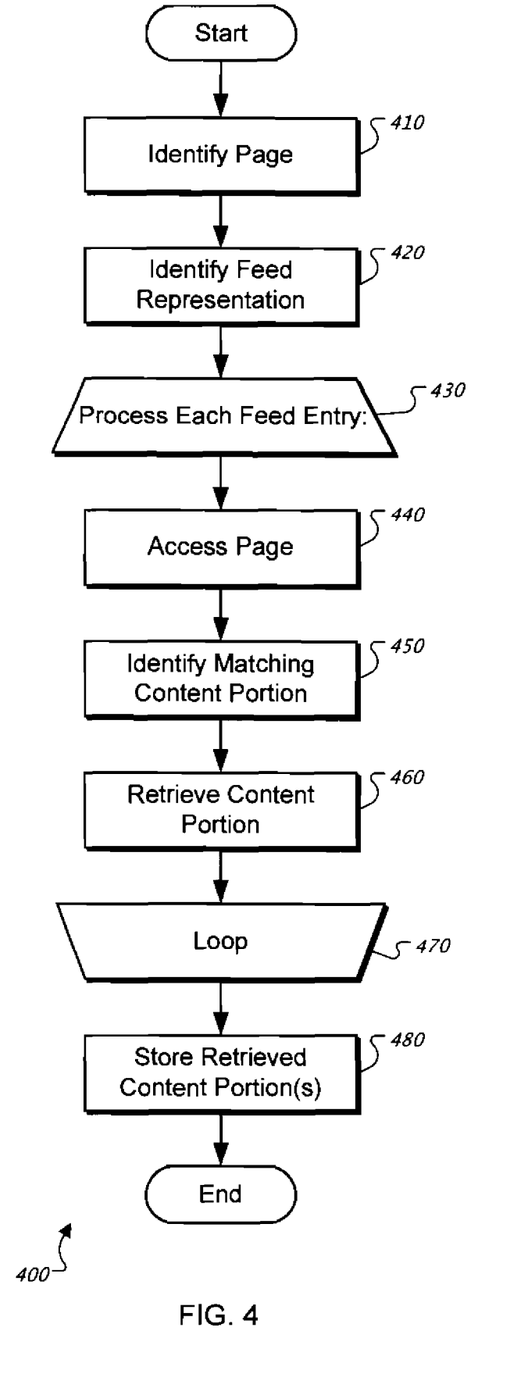
FIG. 4 is another example of a flow chart for a method that can be performed.

As shown, the method 400 includes a step 410 of identifying a page as a target for content retrieval, the page including multiple content portions.

The method 400 includes a step 420 of identifying a feed representation that has been created for the identified page, the identified feed representation including multiple feed entries each corresponding to at least some of the multiple content portions.

The method 400 includes looped steps 430-470 of processing each of the multiple feed entries.

The step 440 in the loop includes accessing the identified page.

The step 450 in the loop includes identifying any of the multiple content portions that match contents of the feed entry being processed.

The step 460 in the loop includes retrieving at least one of the multiple content portions based on the identified content portion.

The step 470 in the loop indicates that the loop can be performed for each feed entry.

The method 400 includes a step 480 of storing, as a result of the content retrieval, each retrieved content portion obtained from the processing of the multiple feed entries.

One or more additional steps can be performed with the method 400, for example as described above with reference to method 300.

When one or more content portion of the page links to another page, the processing of a feed entry can include: accessing the other page to which the first content portion links; identifying contents of the accessed other page that match contents of the first feed entry; and retrieving the identified contents of the accessed other page.

Other approaches in line with one or more aspects of this description can be used.

Figure 5:
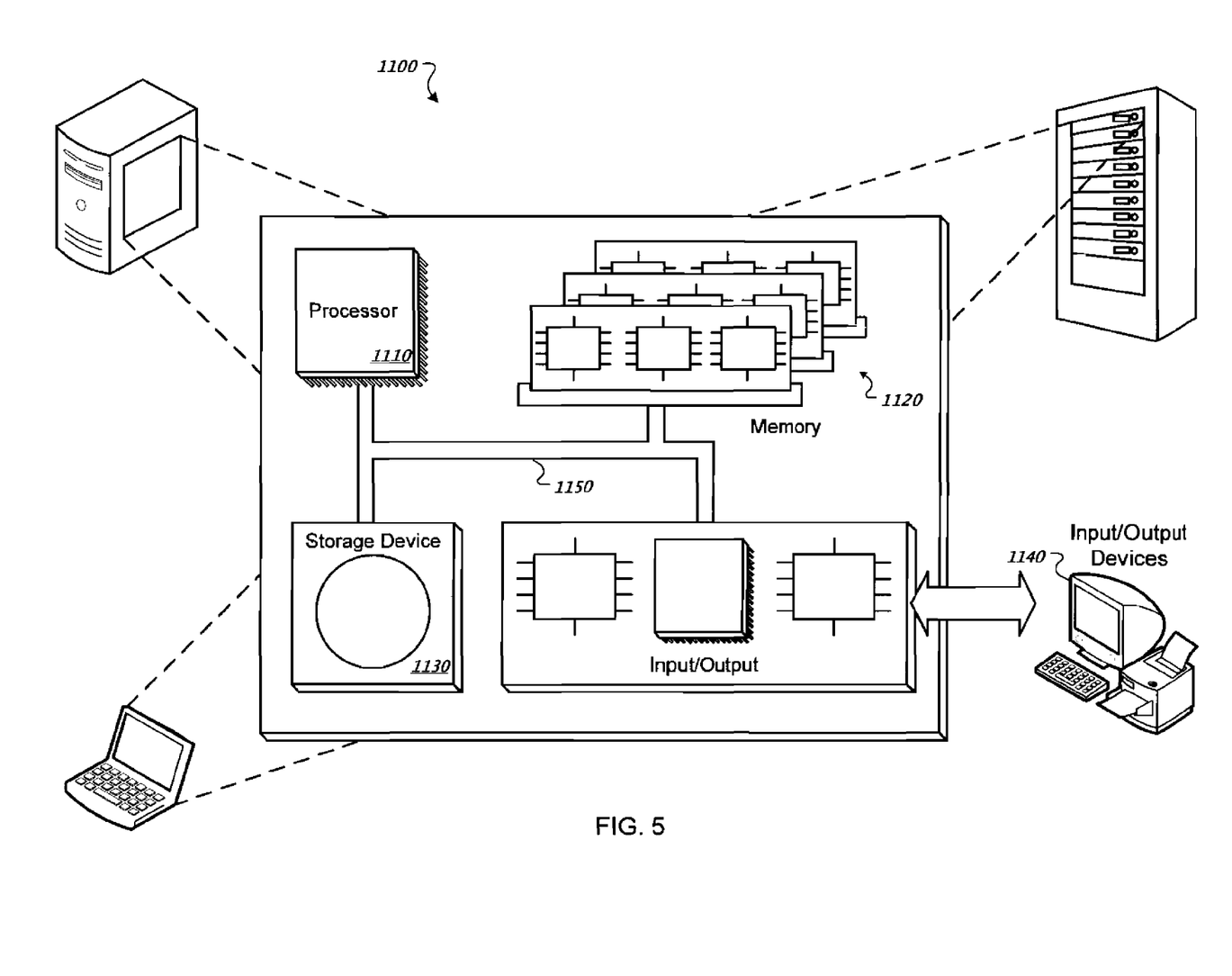
FIG. 5 is a block diagram of a computing system that can be used in connection with computer-implemented methods described in this document.

FIG. 5 is a schematic diagram of a generic computer system 100. The system 1100 can be used for the operations described in association with any of the computer-implement methods described previously, according to one implementation. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of this description.

A number of embodiments have been described. Nevertheless, it will be understood that various modifications may be made without departing from the spirit and scope of this disclosure. Accordingly, other embodiments are within the scope of the following claims.

What is claimed is:

1. A method for automatically mining data, the method comprising:
   identifying, a portion of the page which includes the data to be mined;
   determining that the portion of the page links to another page;
   identifying, a portion of the linked page which includes the data to be mined;
   wherein, the identifying portions of the pages includes:
   using a feed representation created for the page by an entity;
   selecting the portions of the pages as having the data to be mined, wherein the selected portions of the pages include content that is referenced in the feed representation;
   retrieving and storing, the selected portions of the pages as having the data to be mined;
   data mining the selected portions of the pages that have been retrieved and stored;
   identifying a first portion of a second page that is referenced in the feed representations and a second portion of the second page that is not referenced in the feed representation;
   retrieving and storing the second portion and not the first portion of the second page.

2. A computer-implemented method for automatically mining data, the computer-implemented method comprising:
   identifying, in a portion of a page which includes the data to be mined;
   identifying, a portion of a linked page as having data to be mined, wherein the linked page is accessible from the portion of the page;
   wherein, the identifying portions of the page and the linked page includes:
   using a feed representation that has been created for the page by another entity;
   wherein, the portions of the page and the linked page selected as having the data to be mined include content that is referenced in the feed representation;
   retrieving and storing, the portions of the page and the linked page having the data to be mined;
   data mining the portions of the page and the linked page that have been retrieved and stored;
   identifying a first portion of a second page that is referenced in the feed representation and a second portion of the second page that is not referenced in the feed representation;
   retrieving and storing the second portion and not the first portion of the third page.

3. A computer-implemented method for automatically mining data, the computer-implemented method comprising:
   identifying a portion of a page which includes the data to be mined;
   wherein, the portion of the page is selected as having the data to be mined based on determining whether various portions of the page include content that is referenced in a feed representation associated with the page;
   identifying a second page linked to the portion of the page;
   further selecting a portion of the second page which includes the data to be mined,
   wherein the portion of the second page that is selected includes content also referenced in the feed representation;
   retrieving and storing, the portion of the page and the portion of the second page linked to the page, both portions being identified as having the data to be mined;
   data mining the portion of the page and the portion of the second page linked to the page that have been retrieved and stored;
   identifying a first portion of a third page that is referenced in the feed representation and a second portion of the third page that is not referenced in the feed representation;
   retrieving and storing the second portion and not the first portion of the third page.

4. The computer-implemented method of claim 3, further comprising:
   identifying, before retrieving the portion of the page, a part of the feed representation to be used for retrieving the portion from the page.

5. The computer-implemented method of claim 4, further comprising:
   using the part of the feed representation to identify the portion of the page as matching the part of the feed representation.

6. The computer-implemented method of claim 5, wherein using the part of the feed representation comprises:
comparing the part of the feed representation with contents of the page.

7. The computer-implemented method of claim 3, wherein the feed representation includes excerpts of content from the page.

8. The computer-implemented method of claim 3, wherein the feed representation includes one or more of: an RSS feed, an Atom feed, an XML feed, an RDF feed, and a serialized data feed representation.

9. The computer-implemented method of claim 3, further comprising:
identifying a feed entry in the feed representation, the feed entry relating to the portion of the second page;
determining a URL of the second page;
wherein the portion of the second page is retrieved using the URL.

10. The computer-implemented method of claim 3, further comprising, performing text recognition in identifying the portion of the second page.

11. The computer-implemented method of claim 3, further comprising:
determining, using the feed representation, content from the page that is not to be retrieved;
locating such portion in the page having such content and identifying such portion in the page as not having the content to be mined.

12. The computer-implemented method of claim 11, further comprising causing such portion of the page not to be retrieved or stored.

13. A computer-implemented method for automatically mining data, the computer-implemented method comprising:
identifying a first page as a target for content retrieval, the first page including first content portions;
identifying a feed representation that has been created for the first page, the identified feed representation including multiple feed entries each corresponding to some of the first content portions;
identifying a second page linked to at least one of the first content portions of the first page;
identifying the second page as a target for content retrieval, wherein, the second page includes second content portions;
matching content of the multiple feed entries to the first content portions of the first page and the second content portions of the second page;
retrieving those of the first and second content portions of the first and second pages based on the results of the matching; and
storing those of the first and second content portions that are retrieved based on the results of the matching;
performing additional processing, including data mining, on those of the first and second content portions that are stored;
identifying a third content portion of a third page that match the content of at least one of the multiple feed entries and a fourth content portion of the third page that does not match any of the multiple feed entries;
retrieving and storing the fourth content portion and not the third content portion of the third page.

14. The computer-implemented method of claim 13, further comprising:
identifying a feed entry in the feed representation, the feed entry relating to the second content portions of the second page; and
determining a URL of the second page;
wherein the content portions of the second page is retrieved using the URL.

15. The computer-implemented method of claim 13, wherein the feed representation includes excerpts of content from the first page.

16. The computer-implemented method of claim 13, wherein the feed representation comprises one or more of: an RSS feed, an Atom feed, an XML feed, an RDF feed, a serialized data feed representation.

17. The computer-implemented method of claim 13, further comprising, performing text recognition in identifying the content portions of the first and second pages as matching content.

18. The computer-implemented method of claim 13, further comprising:
determining, using the feed representation, content from the first page that is not to be retrieved;
locating such portion in the first page having such content and identifying such portion in the first page as not having the content to be mined.

19. A system for automatically mining data of a webpage, the system comprising:
a first device comprising
a processor and memory, cooperating to function as:
a first identifying unit configured to identify a portion of a webpage which includes data to be mined;
a second identifying unit configured to identify another webpage that is linked to the portion of the webpage as a linked webpage;
a third identifying unit configured to identify a portion of the linked webpage which also includes the data to be mined using a feed representation associated with the webpage, and further identify the portion of the webpage and the portion of the linked webpage;
an analyzing unit configured to analyze the webpage and the linked webpage using the feed representation;
wherein, based on the analysis, the first device identifies the portions of the webpage and the linked webpage as having the data to be mined, based on whether or not the portions include content that is referenced in the feed representation;
a retrieving unit configured to retrieve and store, the portions from the webpage and the linked webpage including the data to be mined;
a mining unit configured to data mine the portions of the webpage and the linked webpage that have been retrieved and stored;
a second device comprising
a processor and memory, cooperating to function as:
a providing unit configured to provide the webpage, the linked webpage and the feed representation for the webpage;
a fourth identifying unit configured to identify a first portion of a second webpage that is referenced in the feed representation and a second portion of the second webpage that is not referenced in the feed representation;
a second retrieving unit configured to retrieve and store the second portion and not the first portion of the second webpage.

* * * * *

UNITED STATES PATENT AND TRADEMARK OFFICE
CERTIFICATE OF CORRECTION

PATENT NO. : 8,924,838 B2  Page 1 of 1
APPLICATION NO. : 11/835079
DATED : December 30, 2014
INVENTOR(S) : Nova Spivack et al.

It is certified that error appears in the above-identified patent and that said Letters Patent is hereby corrected as shown below:

In the Specification

In column 4, line 29, delete "i_upjo." and insert -- i_up_to. --, therefor.

In column 8, line 2, delete "100." and insert -- 1100. --, therefor.

Signed and Sealed this
Twenty-fifth Day of August, 2015

Michelle K. Lee
*Director of the United States Patent and Trademark Office*